3,478,028
**4-SUBSTITUTED-1-HYDROXYLAMINOPHTHALA-
ZINES**
David Gordon Parsons, Hertford, and Alan Frederick
Turner, Worthing, England, assignors to Vantorex
Limited, Loughborough, England, a British company
No Drawing. Continuation-in-part of application Ser. No.
561,037, June 28, 1966. This application May 10, 1967,
Ser. No. 637,347
Claims priority, application Great Britain, July 12, 1965,
29,426/65; Feb. 8, 1966, 5,514/66
Int. Cl. C07d 51/06; A61k 25/00
U.S. Cl. 260—250                                    20 Claims

ABSTRACT OF THE DISCLOSURE

This invention is directed to 1-hydroxylamino-, 1-lower alkoxyamino-, and 1-(N-lower alkyl)hydroxylaminophthalazines, to substituted equivalents thereof wherein a lower alkyl, lower alkoxy, di-lower alkylamino-lower alkoxy, phenyl, phenyl-lower alkyl, pyridyl-lower alkyl, carbo-lower alkoxy-lower alkyl, carboxy-lower alkyl, carbo-hydrazino-lower alkyl, carbamyl-lower alkyl, anilino, lower alkoxy-lower alkyl, phenoxy, hydroxy-lower alkoxy, lower alkoxy-substituted lower alkoxy, amino-lower alkyl or cycloalkyleneimino group replaces the hydrogen atom at the 4-position, and to derivatives thereof wherein the hydroxyl moiety of the hydroxylamine group has been converted into an ester, an amide or a hydrazide. The compounds of this invention have significant pharmacological activity primarily as bronchodilator agents.

---

This application is a continuation-in-part of our copending application Ser. No. 561,037 filed June 28, 1966, entitled "Substituted Phthalazines," now abandoned.

This invention relates to compositions of matter classified in the art of chemistry as substituted phthalazines.

The invention sought to be patented is described as residing in the concept of a chemical compound having a molecular structure in which there is attached to the phthalazine nucleus, at the 1-position, a hydroxylamino radical, and to the hereinafter described equivalents thereof.

As used throughout this application, the terms "lower alkyl" and "lower alkoxy" embrace both straight and branched chain alkyl and alkoxy radicals, respectively, containing from 1 to 6 carbon atoms, for example, but without limitation, methyl, ethyl, n-propyl, isopropyl, n-butyl, tert-butyl, n-amyl, sec-amyl, n-hexyl, 2-ethylbutyl, 2,3-dimethylbutyl and the like in the case of "lower alkyl" and methoxy, ethoxy, n-propoxy, isopropoxy, n-butoxy, tert-butoxy, n-amyloxy, sec-amyloxy, n-hexyloxy, 2-ethylbutoxy, 2,3-dimethylbutoxy and the like in the case of "lower alkoxy"; the term "halo" embraces bromo, chloro, fluoro and iodo; and the term "cycloalkyleneimino" embraces cycloalkyleneimino groups containing from 4 to 5 carbon atoms, for example, but without limitation, pyrrolidino and piperidino which are linked to the 4-position of the phthalazine nucleus through the nitrogen atom.

The tangible embodiments of this invention possess the inherent general physical characteristics of being solid crystalline materials. Infra-red spectral data and elemental analysis, taken together with the nature of the starting materials and mode of synthesis, positively confirm the structure of the compounds sought to be patented.

The tangible embodiments of this invention possess the inherent applied use characteristics of having significant pharmacological activity, without demonstrable adverse toxicity, as bronchodilator agents. For example, the tangible embodiments of the present invention were found to have bronchodilator activity equivalent to or better than the known bronchodilator agent aminophylline when evaluated in vivo in the guinea pig according to the method of H. Konzett and R. Rössler (Naunyn-Smiedeberg's Arch. exp. Path. Pharmak. 195:71–74 (1940)) and also when evaluated in vitro in an isolated tissue bath employing guinea pig tracheal tissue at doses and concentrations, respectively, comparable to those of the aminophylline standard, both of these methods being recognized and accepted as pharmacological test procedures for the evaluation of bronchodilator activity. In addition, compounds within the scope of this invention have also shown significant pharmacological activity as antipyretic, anti-inflammatory, hypotensive and respiratory stimulant agents as determined by recognized and accepted pharmacological test procedures.

In addition the tangible embodiments of this invention are valuable as chemical intermediates in the sythesis of other substituted phthalazines having significant pharmacological activity. For example, 1-hydroxylamino-4-methylphthalazine, when treated for several hours at room temperature with ethylchloroformate, forms an ester which then upon being heated to effect ring closure yields 6-methyl-3-keto-3H-[1,2,4]-oxadiazolo-[3,4-a]-phthalazine. Such esters and substituted oxadiazolophthalazines are described and claimed in our application entitled "Substituted Oxadiazolophthalazines and Intermediates Obtained in the Synthesis Thereof," filed June 28, 1966 under Ser. No. 561,046.

The manner and process of making and using the invention will now be generally described so as to enable one skilled in the art of chemistry to make and use the same as follows:

The following reaction sequence illustrates the preparation of the tangible embodiments of this invention:

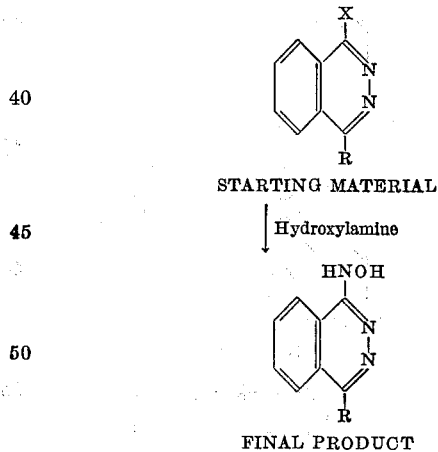

wherein X is halogen and R is hydrogen or one of its hereinafter described equivalents.

The starting materials for the preparation of tangible embodiments of this invention by the foregoing reaction sequence are 1-halo-4-R-phthalazines which are readily prepared as described by A. Leick, Ber. 38:3918 (1905) and J. Druey et al., Helv. Chim. Acta, 34:195–210 (1951).

In carrying out the above described reaction sequence, starting materials in which the hydrogen atom at the 4-position is replaced by a lower alkyl, phenyl, phenyl-lower alkyl, pyridyl-lower alkyl, carbo-lower alkoxy-lower alkyl, carbamyl-lower alkyl, anilino, lower alkoxy-lower alkyl or amino-lower alkyl radical are the full equivalents of the specific 1-halophthalazine starting material depicted hereinabove in the reaction sequence. Their use in the foregoing reaction sequence yields final products bearing corresponding substitution at the 4-position which are the full equivalents of the specific 1-hydroxylaminophthalazine final product depicted hereinabove and have the same utility, and are included within the scope of this invention.

According to the reaction sequence depicted above, the starting material is converted to the tangible embodiments of this invention by refluxing a 1-halophthalazine starting material, or one of its appropriately 4-substituted-1-halophthalazine equivalents as above defined, with hydroxylamine in the presence of an inert, non-reactive organic solvent, such as for example, methanol, ethanol and the like. Among the appropriately 4 - substituted - 1 - halophthalazine starting materials that are useful for preparing the tangible embodiments of this invention are methyl-4-chloro-1-phthalazine acetate, 4-chloro-1-phthalazineacetamide, 1 - chloro-4-methylphthalazine, 1-chloro-4-phenylphthalazine, 1 - chloro-4-(p-methoxyphenyl)-phthalazine, 1 - chloro - 4 - anilinophthalazine, 1-chloro-4-(p-chloroanilino)phthalazine, 1 - chloro - 4-benzylphthalazine, 1-chloro - 4-(p-methoxybenzyl)-phthalazine, 1-chloro-4-(2-pyridylmethyl)phthalazine, 1-chloro-4-(4-pyridylmethyl)-phthalazine and 1-chloro-4-(4-phenylbutyl)phthalazine, as well as the corresponding 1-bromo-, 1-iodo- and 1-fluoro-equivalents thereof. The 4 - substituted-1-hydroxylaminophthalazines comprising the tangible embodiments of this invention prepared according to the foregoing reaction sequence are recovered by conventional techniques of isolation and crystallization.

Where the R substituent at the 4-position in the final product contains an oxygen atom through which it is attached to the phthalazine nucleus, such as lower alkoxy, hydroxy-lower alkoxy, lower alkoxy-substituted lower alkoxy, di-lower alkylamino-lower alkoxy, or a cyclic saturated organic base-lower alkoxy equivalent thereof, such as N-piperidino-lower alkoxy or N-morpholino-lower alkoxy, or phenoxy, preparation is as follows:

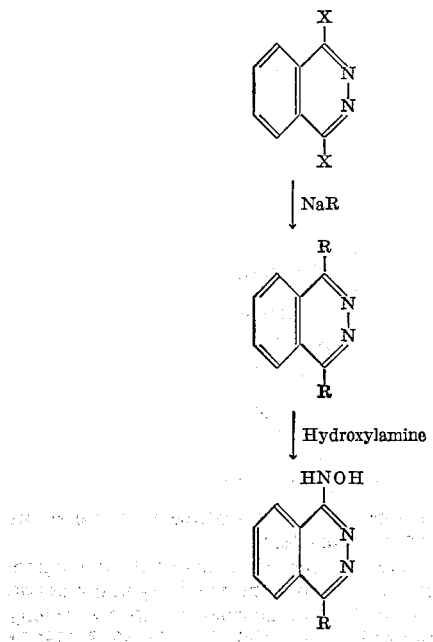

wherein X is halogen and R is lower alkoxy, di-lower alkylamino-lower alkoxy or one of its above-described equivalents, phenoxy, hydroxy-lower alkoxy and lower alkoxy-substituted lower alkoxy.

The starting material for preparing the tangible embodiments of this invention, using the above-described first alternate synthetic sequence, is a 1,4-dihalophthalazine such as, for example, 1,4-dichlorophthalazine. Such starting materials are commercially available or may be prepared as described by Hirsch and Orphanos, Can. J. Chem. 43:2708–10 (1965), who treat 1,4-phthalazinedione with a phosphorus pentahalide, for example phosphorus pentachloride, at atmospheric pressure in the presence of a halogenated solvent.

In carrying out the above-described reaction sequence, the starting material is first converted to a 1,4-di-lower alkoxy-or 1,4-diphenoxyphthalazine by treatment with an appropriate sodium alcoholate or sodium phenolate. Such 1,4-di-lower alkoxy-and 1,4-diphenoxyphthalazines are described, together with the method of their preparation by Elvidge and Redman, J. Chem. Soc. 1710 (1965). The 1,4 - di-lower alkoxy- or 1,4-diphenoxyphthalazine intermediate is then treated with hydroxylamine or an equivalent thereof, such as, for example, methoxyamine, in an inert solvent such as methanol and in the presence of anhydrous sodium acetate. The reaction products are recovered by conventional techniques of isolation and crystallization.

In the case of tangible embodiments wherein the substituent at the 4-position is a cycloalkyleneimino substituent containing a tertiary nitrogen atom through which it is linked to the phthalazine nucleus, the following alternate reaction sequence is preferred:

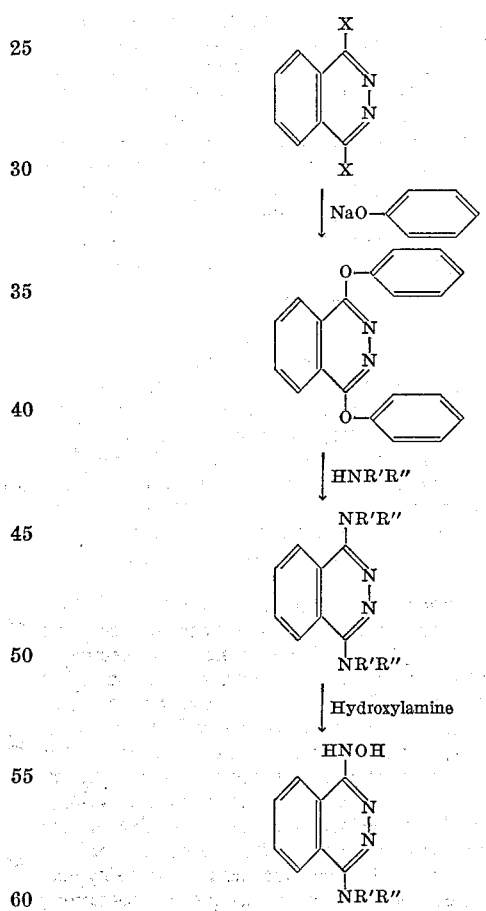

wherein X is halogen and —NR'R" is a cycloalkyleneamine.

In carrying out this reaction sequence the starting material is the same as that employed in the previously described alternate reaction sequence leading to oxygen-linked substitution at the 4-position of a phthalazine nucleus. Preparation of the 1,4-diphenoxyphthalazine intermediate is also as described above. Conversion of the 1,4-diphenoxyphthalazine intermediate to the 1,4-di-NR'R"-phthalazine intermediate is carried out by treatment with the appropriate HNR'R" cycloalkyleneamine at reflux temperature with the base also serving as solvent for the reaction. This method is also described in the Elvidge and Redman reference, where preparation of 1,4-di-N-morpholinophthalazine is described. Conversion of this intermediate is then obtained by treatment with hydroxylamine in an inert solvent such as methanol and in the presence of anhydrous sodium acetate. The reaction products are recovered by conventional techniques of isolation and crystallization.

As equivalent reactants in this second alternate reaction sequence, there may be employed, in the place of the cycloalkyleneamines depicted above, cyclic organic bases wherein one of the carbon atoms o fthe cycloalkyleneamine has been replaced by an oxygen atom or a lower alkyl-substituted nitrogen atoms, for example, morpholine or 4-methylpiperazine. The use of such cyclic organic bases results in the preparation of tangible embodiments of this invention wherein the substituent at the 4-position corresponds to the cyclic organic base employed and is linked to the phthalazine nucleus through its nitrogen atom. Such products have the same utility as the specific cycloalkylene-imino-substituted final products and are, hence, their full equivalents and are included within the scope of this invention.

Starting materials wherein the benzene ring of the phthalazine nucleus and/or the benzene ring of a phenyl, phenyl-lower alkyl or anilino-lower alkyl R substituent bears one or more lower alkyl, nitro, halogen, amino, di-lower alkylamino, carboxy or lower alkoxy groups, are prepared by the same procedures set forth in the Leick and Druey and the Hirsch and Orphanos papers referred to hereinabove, and are the full equivalents of the specific starting materials depicted hereinabove. Their use in the above described reaction sequences results in the preparation of products having lower alkyl, nitro, halogen, amino, di-lower alkylamino, carboxy or lower alkoxy substituents at the same place as in the statring materials, such products having the same utility as the specific products depicted in the above reaction sequence.

As equivalent reactants in the foregoing reaction sequences to hydroxylamine, there may be employed substituted hydroxylamines of the formula $R_1HN$—$OR_2$ wherein $R_1$ is hydrogen, lower alkyl, phenyl, phenyl-lower alkyl, or phenyl or phenyl-lower alkyl wherein the phenyl group bears one or more lower alkyl, lower alkoxy, nitro, halo, amino, di-lower alkyl-amino, or carboxy groups and $R_2$ is hydrogen or lower alkyl, at least one of $R_1$ and $R_2$ being other than hydrogen. The use of such substituted hydroxylamines in the reaction sequences results in the preparation of tangible embodiments of this invention wherein the nitrogen atom of the hyroxylamino substituent at the 1-position of the nucleus bears $R_1$ and $OR_2$ substituents corresponding to the reactant used, such products having the same utility as the specific products described above and being included within the scope of the invention.

The tangible embodiments of this invention wherein the R substituent at the 4-position is a carbo-lower alkoxy-lower alkyl group are readily hydrolyzed to the corresponding 4-carboxy-lower alkyl compounds by treatment with dilute mineral acid. Treatment with hydrazine hydrate results in conversion of the carbo-lower alkoxy moiety of the 4-position substituent to a radical of the formula —CO—NH—$NH_2$(carbohydrazino). Such reaction products are included within the scope of the tangible embodiments of the invention.

The tangible embodiments of this invention wherein the substituent at the 1-position is a radical of the formula $R_1NOH$, $R_1$ being as described above, are readily converted into esters by treatment with a lower alkyl carboxylic anhydride such as acetic anhydride, thereby converting the OH group into a radical of the formula —O—CO—lower alkyl. Such esters are the full equivalents of the non-esterfied hydroxylamino compounds from which they are derived and are included within the scope of the invention.

The tangible embodiments of this invention wherein the substituent at the 1-position is a radical of the formula HN—$OR_2$ wherein $R_2$ is hydrogen or lower alkyl are capable of existing in the tautomeric hydroxylimino form:

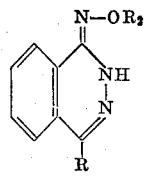

Such tautomers are equivalent to the 1-hydroxylamino substituted compounds described above and are included within the scope of the invention.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexylbromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventors for carrying out the invention will now be set forth as follows:

The following examples are illustrative of the first described reaction sequence:

EXAMPLE 1

1-hydroxylaminophthalazine

A solution of 1-chlorophthalazine (16.4 g.) in methanol (600 ml.) is treated with anhydrous sodium acetate (40 g.) and hydroxylamine hydrochloride (23 g.). After stirring the mixture for 6 days at room temperature the inorganic material present is filtered off and solution kept at 0° C. The product is collected in the form of yellow needles which are recrystallized from methanol to yield 6.9 g. (43%) of needles, M.P. 188°–190° C.

*Analysis.*—Calculated for $C_8H_7N_3O$: C, 59.6%; H, 4.4%; N, 26.1%. Found: C, 59.4%; H, 4.3%; N, 26.4%

Examples 2–9 illustrate the preparation of 1-hydroxylaminophthalazines having a lower alkyl substituent at the 4-position.

EXAMPLE 2

1-hydroxylamino-4-methylphthalazine

A solution of 1-chloro-4-methylphthalazine (20 g.) in methanol (75 ml.) is treated with a solution of hydroxylamine hydrochloride (14.0 g.) and sodium carbonate (15.0 g., 0.15 mole) in water (40 ml.). After refluxing for two hours and allowing to stand at room temperature overnight a yellow precipitate forms. The product is collected and recrystallized successively from dioxan and ethanol to yield 12.2 g. (62%) of bright yellow needles, M.P. 226°–228° C.

*Analysis*—Calculated for $C_9H_9N_3O$: C, 61.7%; H, 5.2%; N, 24.0%. Found: C, 62.1%; H, 5.4%; N, 23.8%.

EXAMPLE 3

1-hydroxylamino-4-ethylphthalazine

A solution of 1-chloro-4-ethylphthalazine (40 g.) in methanol (800 ml.) is treated with hydroxylamine hydrochloride (41 g.) and anhydrous sodium acetate (82 g.) at room temperature overnight and at reflux temperature for one hour. The product is collected and recrystallized from ethanol to yield 28.0 g. of yellow needles, M.P. 204°–207° C.

Analysis.—Calculated for $C_{10}H_{11}N_3O$: C, 63.5%; H, 5.9%; N, 22.2%. Found: C, 63.8%; H, 5.9%; N, 22.1%.

EXAMPLE 4

1-hydroxylamino-4-n-propylphthalazine

A mixture of 1-chloro-4-n-propylphthalazine (14.4 g.), anhydrous sodium acetate (57.3 g.) and hydroxylamine hydrochloride (29.1 g.) in methanol (500 ml.) is stirred at room temperature for 16 hours and then at reflux temperature for 5 hours. The product is collected and recrystallized from methanol to yield 8.4 g. of yellow crystals, M.P. 220°–224° C.

Analysis.—Calculated for $C_{11}H_{13}N_3O$: C, 65.0%; H, 6.5%; N, 20.7%. Found: C, 64.9%; H, 6.5%; N, 20.8%.

EXAMPLE 5

1-hydroxylamino-4-isopropylphthalazine

A solution of 1-chloro-4-isopropylphthalazine (40 g.) in methanol (800 ml.) is treated with hydroxylamine hydrochloride (37 g.) and anhydrous sodium acetate (76 g.) to give a product which upon recrystallization from ethanol yields 21.9 g. of yellow prisms, M.P. 193°–195° C.

Analysis.—Calculated for $C_{11}H_{13}N_3O$: C, 65.0%; H, 6.5%; N, 20.8%. Found: C, 65.5%; H, 6.6%; N, 20.5%.

EXAMPLE 6

1-hydroxylamino-4-n-butylphthalazine

A solution of 1 - chloro - 4 - n-butylphthalazine (8.0 g.) in methanol (30 ml.) is treated with a solution of hydroxylamine (2.8 g.) and sodium carbonate (2.1 g.) in the same manner as described in Example 2. The product is recrystallized from ethanol to yield 4.7 g. (59%) of yellow needles, M.P. 189°–191° C.

Analysis.—Calculated for $C_{12}H_{15}N_3O$: C, 66.33%; H, 6.96%; N, 19.35%. Found: C, 66.52%; H, 6.97%; N, 19.15.

In like manner the following examples were prepared:

EXAMPLE 7

1-hydroxylamino-4-sec-butylphthalazine

M.P. 180°–1830 C.

Analysis.—Calculated for $C_{12}H_{15}N_3O$: C, 66.34%; H, 6.96%; N, 19.34%. Found: C, 66.22%; H, 7.02%; N, 19.25%.

EXAMPLE 8

1-hydroxylamino-4-isobutylphthalazine

M.P. 205°–215° C. (d.).

Analysis.—Calculated for $C_{12}H_{15}N_3O$: C, 66.34%; H, 6.96%; N, 19.34. Found: C, 66.16; H, 6.82%; N, 19.20%.

EXAMPLE 9

1-methoxyamino-4-n-propylphthalazine

M.P. 94°–95° C.

Analysis.—Calculated for $C_{12}H_{15}N_3O$: C, 66.34%; H, 6.96%; N, 19.34%. Found: C, 66.4%; H, 7.1%; N, 19.3%.

Examples 10 and 11 are illustrative of the preparation of 1-hyroxylaminophthalazines having a phenyl or substituted phenyl substituent at the 4-position.

EXAMPLE 10

1-hydroxylamino-4-phenylphthalazine

A mixture of 1 - chloro - 4 - phenylphthalazine (24.0 g.) anhydrous sodium acetate (16.4 g.) and hydroxylamine hydrochloride (14.0 g.) in methanol (200 ml. are stirred together for 18 hours at room temperature and then for two hours at reflux temperature. The methanol is distilled away under reduced pressure and the residue washed with water. The product is twice recrystallized from ethanol to yield 12.9 g. (55%) of fine yellow needles, M.P. 251°–253° C.

Analysis.—Calculated for $C_{14}H_{11}N_3O$: C, 70.9%; H, 4.7%; N, 17.7%. Found: C, 71.8%; H, 5.1%; N, 17.7%.

EXAMPLE 11

1-hydroxylamino-4-(m-nitrophenyl)phthalazine

A mixture of 1 - chloro - 4 - (m-nitrophenyl)phthalazine (34 g.), hydroxylamine hydrochloride (49.8 g.) and sodium acetate (98 g.) in methanol (500 ml.) is heated at reflux temperature for 28 hours. The solid product is collected, washed with water and dried to give 33.4 g. of yellow needles which are recrystallized from ethanol, M.P. 237°–239° C.

Analysis.—Calculated for $C_{14}H_{10}N_4O_3$: C, 59.6%; H, 3.6%; N, 19.9%. Found: C, 59.7%; H, 3.4%; N, 19.6%.

By analogous procedures, other 1 - hydroxylamino-4-(substituted phenyl)phthalazines can be prepared in which the phenyl group is otherwise substituted as described hereinabove.

Examples 12–14 are illustrative of the preparation of 1 - hydroxylaminophthalazines having a phenyl-lower alkyl or substituted phenyl-lower alkyl substituent at the 4-position.

EXAMPLE 12

1-hydroxylamino-4-benzylphthalazine

A mixture of 1 - chloro - 4 - benzylphthalazine (25.5 g.) anhydrous sodium acetate (16.4 g.) and hydroxylamine hydrochloride (13.9 g.) in methanol (250 ml. are allowed to react as described in Example 7. The product is recrystallized from ethanol to yield 16.1 g. (63%) of yellow needles, M.P. 235°–236° C.

Analysis.—Calculated for $C_{15}H_{13}N_3O$: C, 71.7%; H, 5.2%; N, 16.2%. Found: C, 71.4%; H, 5.2%; N, 15.6%.

EXAMPLE 13

1-hydroxylamino-4-(p-methoxybenzyl)phthalazine

A mixture of 1 - chloro -4 - (p-methoxybenzyl) phthalazine (50.0 g.) anhydrous sodium acetate (33.0 g.) and hydroxylamine hydrochloride (28.0 g.) in methanol (550 ml.) are allowed to react as described in Example 7. The product is recrystallized from dioxan to yield 31.2 g. (64%) of yellow needles, M.P. 211°–213° C.

Analysis.—Calculated for C, $_{16}H_{15}N_3O_2$: C, 68.3%; H, 5.4%; N, 14.9%. Found: C, 68.7%; H, 5.7%; N, 14.8%.

EXAMPLE 14

1-hydroxylamino-4-(p-nitrobenzyl)phthalazine

A mixture of 1-chloro-4-(p-nitrobenzyl)phthalazine (33.7 g.) anhydrous sodium acetate (93.0 g.) and hydroxylamine hydrochloride (47.5 g.) in methanol (1000 ml.) are stirred together for 65 hours at reflux temperature. The product is crystallized from dioxan to yield 27.8 g. (83%) of yellow needles M.P. 235°–236° C.

Analysis.—Calculated for $C_{15}H_{12}N_4O_3$: C, 60.8%; H, 4.1%; N, 18.9%. Found: C, 60.6%; H, 4.2%; N, 18.4%.

By analogous procedures, other 1-hydroxylamino-4-(phenyl-lower alkyl-phthalazines can be prepared in which the lower alkyl portion is a straight or branched chain group containing 2–6 carbon atoms. In addition, the phenyl group may be otherwise substituted as described hereinabove.

Examples 15 and 16 illustrate the preparation of 1-hydroxylaminophthalazines having a pyridyl-lower alkyl substituent at the 4-position.

EXAMPLE 15

1-hydroxylamino-4-(4-pyridylmethyl)phthalazine

A mixture of 1-chloro-4-(4-pyridylmethyl)phthalazine (13.0 g.,) anhydrous sodium acetate (20.5 g.) and hydroxylamine hydrochloride (10.4 g.) in methanol (300 ml.) is stirred at room temperature for 48 hours. The product is collected and recrystallized from methanol to yield the desired product as thick needles, M.P. 215°–218° C.

*Analysis.*—Calculated for $C_{14}H_{12}N_4O$: C, 66.7%; H, 4.8%; N, 22.2%. Found: C, 66.7%; H, 4.5%; N, 22.0%.

Treatment with hydrochloric acid yields the dihydrochloride dihydrate, M.P. 233°–235° C.

*Analysis.*—Calculated for $C_{14}H_{12}N_4O \cdot 2HCl \cdot 2H_2O$: C, 46.6%; H, 5.0%; N, 15.5%; Cl, 19.6%. Found: C, 46.7%; H, 5.1%; N, 15.5%; Cl, 19.5%.

EXAMPLE 16

1-hydroxylamino-4-(2-pyridylmethyl)phthalazine

A mixture of 1-chloro-4-(2-pyridylmethyl)phthalazine (35 g.), hydroxylamine hydrochloride (57 g.) and anhydrous sodium acetate (112 g.) in methanol (500 ml.) is stirred at room temperature for 40 hours. The product is recrystallized from methanol to yield 7.0 g. of yellow needles, M.P. 205°–207° C.

*Analysis.* Calculated for $C_{14}H_{12}N_4O$: C, 66.7%; H, 4.8%; N, 22.2%. Found: C, 66.6%; H, 4.9%; N, 22.3%.

The corresponding 3-pyridyl-lower alkyl analogous can be prepared by analogous procedures. Also, the lower alkyl portion of the pyridyl-lower alkyl substituent can be straight or branched chain groups containing 2 to 6 carbon atoms.

Examples 17 and 18 illustrate the preparation of 1-hydroxylaminophthalazines having an anilino or substituted anilino group at the 4-position.

EXAMPLE 17

1-hydroxylamino-4-anilinophthalazine

A suspension of 1-chloro-4-anilinophthalazine (3.5 g.), hydroxylamine hydrochloride (3.2 g.) and sodium acetate (6.6 g.) in methanol (100 ml.) is heated under reflux for 3 hours and then stirred overnight at room temperature. The yellow crystalline product is collected, washed with water and dried to give 1.51 g. Recrystallization of 500 mg. from methanol (300 ml.) gives 300 mg. of product, M.P. 208°–210° d.; the hydrochloride, M.P. 195°–197° C.

Analysis of free base.—Calculated for $C_{14}H_{12}N_4O$: C, 66.7%; H, 4.8%; N, 22.2%. Found: C, 66.6%; H, 5.0%; N, 22.0%.

EXAMPLE 18

1-hydroxylamino-4-p-chloroanilino)phthalazine 1-chloro-4-(p-chloroanilino)phthalazine (11.0 g.) is heated with hydroxylamine hydrochloride (7.7 g.) and sodium acetate (15.7 g.) in methanol (350 ml.) under reflux for 16 hours to give 7.05 g. of product. The product (6.55 g.) is converted to the hydrochloride salt by dissolving in a hot mixture of dioxan (120 ml.) and 1 N hydrochloric acid (50 ml.). The hydrochloride crystallizes on cooling in the form of fine yellow needles (6.02 g.), M.P. 190°–194° C.

Analysis of the free base. — Calculated for $C_{14}H_{11}ClN_4O$: C, 58.6%; H, 3.9%; N, 19.6%; Cl, 12.4%. Found: C, 58.7%; H, 3.6%; N, 20.3%; Cl, 12.1%.

By analogous procedures, 1-hydroxylamino-4-anilinophthalazines can be prepared in which the phenyl group is otherwise substituted as described hereinabove.

Example 19 illustrates the preparation of 1-hydroxylaminophthalazines bearing, at the 4-position, a carbo-lower alkoxy-lower alkyl substituent.

EXAMPLE 19

Methyl-1-hydroxylamino-4-phthalazine acetate 1-chloro-4-phthalazine acetic acid, methyl ester (3.0 g) in methanol (30 ml.) is treated with hydroxylamine hydrochloride (3.0 g.) and anhydrous sodium acetate (6.0 g.) and stirred at room temperature for 18 hours. The product (2.15 g.) is collected, washed with water, methanol and ether and then recrystallized from dioxan to yield yellow needles (1.16 g.), M.P. 230°–234° C.

*Analysis.*—Calculated for $C_{11}H_{11}N_3O_3$: C, 56.6%; H, 4.8%; N, 18.0%. Found: C, 56.5%; H, 4.8%; N, 17.9%.

In analogous procedures utilizing other lower alkyl esters of 1-chloro-4-phthalazine lower alkyl carboxylic acids, products are prepared in which the substituent at the 4-position of the nucleus is the carbo-lower alkoxy-lower alkyl group corresponding to that of the starting material.

Example 20 is illustrative of the preparation of 1-hydroxylaminophthalazines bearing a carbamyl-lower alkyl substituent at the 4-position.

EXAMPLE 20

1-hydroxylamino-4-phthalazineacetamide

A suspension of 1-chloro-5-phthalazineacetamide (10.2 g.) in methanol (250 ml.) is stirred with sodium acetate (20 g.) and hydroxylamine hydrochloride (10 g.) while being heated under reflux for 90 minutes. It is then kept at room temperature for 2 days. The product was isolated in the usual manner, to give 7.31 g. fine yellow needles, M.P. 262°–263° (decomp.).

*Analysis.*—Calculated for $C_{10}H_{10}N_4O_2$: C, 55.0%; H, 4.6%; N, 25.7%. Found: C, 55.5%; H, 4.9%; N, 25.1%.

Use of starting materials wherein the lower alkyl portion of the carbamyl-lower alkyl substituent at the 4-position is a straight or branched chain group of 2–6 carbon atoms results in the preparation of final products bearing corresponding substitution.

Examples 21 and 22 illustrate the conversion of 1-hydroxylamino-4-(carbo-lower alkoxy-lower alkyl)phthalazines to 4-carboxy-lower alkyl and 4-carbo-hydrazine-lower alkyl analogues.

EXAMPLE 21

1-hydroxylamino-4-phthalazine acetic acid

The methyl ester (12.0 g.), formed as described in Example 16, is heated under reflux for 1 hour in 2 N hydrochloric acid (100 ml.). The product is cooled, filtered and carefully neutralized to pH 6.0 with sodium bicarbonate solution. The precipitated acid is collected, washed with water, methanol and ether, and dried at 100° C. to give 10.9 g. of solid, M.P. 218°–222° C. (decomp.).

*Analysis.*—Calculated for $C_{10}H_9N_3O_3 \cdot H_2O$: C, 50.6%; H, 4.7%; N, 17.7%. Found: C, 50.5%; H, 4.7%; N, 17.7%.

EXAMPLE 22

1-hydroxylamino-4-phthalazineacethydrazide

The methyl ester (17.5 g.), formed as described in Example 16, in dioxan (280 ml.) is heated with stirring with hydrazine hydrate (25 g.) for 3 hours at 80°–85° C. After standing at room temperature for 4 days the product is collected, washed with water, methanol and ether, and then dried to give 17.3 g. solid material, M.P. 254°–257° C. (decomp.).

*Analysis.*—Calculated for $C_{10}H_{11}N_5O_2$: C, 51.5%; H, 4.75%; N, 30.0%. Found: C, 51.5%; H, 4.6%; N, 30.0%.

Example 23 is illustrative of the preparation of tangible embodiments of this invention wherein an N-lower alkylhydroxylamine is used as reactant in place of hydroxylamine.

EXAMPLE 23

1-N-methylhydroxylamino-4-methylphthalazine

A mixture of 1-chloro-4-methylphthalazine (20 g.), N-methylhydroxylamine (30 g.) and anhydrous sodium acetate (100.0 g.) is allowed to stand in methanol (800 ml.) for 3 days at room temperature. The methanol is removed under vacuum and the residual solid washed with ice water (150 ml.). The crude product is recrystallized from dioxane to yield 7.6 g., M.P. 188°–191° C.

*Analysis.*—Calculated for $C_{10}H_{11}N_3O$: C, 63.4%; H, 5.9%; N, 22.2%. Found: C, 63.8%; H, 6.1%; N, 22.1%.

Example 24 is illustrative of the preparation of tangible embodiments of this invention wherein an O-substituted hydroxylamine is used as reactant in place of hydroxylamine.

EXAMPLE 24

1-methoxyamino-4-methylphthalazine 1-chloro-4-methylphthalazine (15.0 g.) is heated in an autoclave (1000 ml.) for two days at 105° with excess methoxyamine in methanol (800 ml.) containing sodium acetate (75.0 g.). The methanol is then stripped off and the residue extracted with boiling ether. The ether is evaporated and the residual solid washed with water (12.6 g., M.P. 185°–190°). This is converted to the hydrochloride (8.5 g.) M.P. 190°–210° (decomp.).

*Analysis.*—Calculated for $C_{10}H_{11}N_3O$: C, 63.5%; H, 5.8%; N, 22.2%. Found: C, 63.2%; H, 5.5%; N, 21.8%.

Examples 25 and 26 are illustrative of the esterification of 1-hydroxylaminophthalazines.

EXAMPLE 25

O-acetyl-N(4-methyl-1-phthalazinyl)hydroxylamine

A suspension of the 1-hydroxylamino-4-methylphthalazine (10 g.), prepared as described in Example 2, in acetic anhydride (50 ml.) is shaken at room temperature for two hours. The product is cooled in ice, collected, washed with water and recrystallized from alcohol (200 ml.) to give 10.2 g. product, M.P. 179°–182° C.

*Analysis.*—Calculated for $C_{11}H_{11}N_3O_2$: C, 60.8%; H, 5.19%; N, 19.4%. Found: C, 60.5%; H, 4.9%; N, 19.6%.

EXAMPLE 26

O-acetyl-N(4-carbomethoxymethyl-1-phthalazinyl)hydroxylamine

Methyl 1-hydroxylamino-4-phthalazineacetate (10.0 g.) prepared as described in Example 16, is shaken in acetic anhydride (70 ml.) at room temperature. After 30 minutes a pale yellow solution is obtained. This is filtered and concentrated in vacuo at 40°. On cooling the acetate crystallized, the mixture is shaken with ether (100 ml.) and the product collected, washed with ether and recrystallized from alcohol (150 ml.) to give 7.5 g. product, M.P. 114°–116° C. This product combined with another sample (8.5 g.) and twice recrystallized from alcohol gives pale pink crystals (10 g.) M.P. 115°–117° C.

*Analysis.*—Calculated for $C_{13}H_{13}N_3O_4$: C, 56.7%; H, 4.8%; N, 15.3%. Found: C, 56.6%; H, 4.6%; N, 15.4%.

By analogous procedures, other lower alkyl carboxylic acid anhydrides can be employed to prepare the corresponding lower alkyl esters.

By the same first described reaction sequence were also prepared:

EXAMPLE 27

1-hydroxylamino-4-methaxymethylphathalazine

M.P. 268°–272° C.

*Analysis.*—Calculated for $C_{10}H_{11}N_3O_2$: C, 58.5%; H, 5.4%; N, 20.5%. Found: C, 58.5%; H, 5.4%; N, 20.6%.

EXAMPLE 28

1-hydroxylamino-4-(2-diethylaminoethyl)phthalazine

M.P. 162°–163° C.

*Analysis.*—Calculated for $C_{14}H_{20}N_4O$: C, 64.6%; H, 7.7%; N, 21.5%. Found: C, 64.6%; H, 7.8%; N, 21.6%.

EXAMPLE 29

1-hydroxylamino-4-(2-dimethylaminoethyl)phthalazine

M.P. 161°–162° C.

*Analysis.*—Calculated for $C_{12}H_{16}N_4O$: C, 62.1%; H, 6.9%; N, 24.1%. Found: C, 62.1%; H, 6.9%; N, 24.0%.

EXAMPLE 30

1-hydroxylamino-4-(2-N-morpholinoethyl)phthalazine monohydrochloride monohydrate

M.P. 260°–261° C.

*Analysis.*—Calculated for $C_{14}H_{18}N_4O_2 \cdot HCl \cdot H_2O$: C, 51.2%; H, 6.4%; Cl, 10.8%; N, 17.0%. Found: C, 51.8%; H, 6.4%; Cl, 10.8%; N, 16.6%.

EXAMPLE 31

1-hydroxylamino-4-(2-N-piperidinoethyl)phthalazine monohydrochloride

M.P. 260°–263° C.

*Analysis.*—Calculated for $C_{15}H_{20}N_4O \cdot HCl$: C, 58.3%; H, 6.9%; Cl, 11.5%; N, 18.1%. Found: C, 58.1%; H, 6.9%; Cl, 11.4%; N, 17.9%.

The following examples are illustrative of substituted hydroxylaminophthalazines wherein the substituent in the 4-position contains an oxygen atom through which it is attached to the phthalazine nucleus, as prepared according to the second described reaction sequence.

EXAMPLE 32

1-hydroxylamino-4-ethoxypthalazine (a) 1,4 - diethoxyphthalazine.—1,4 - dichlorophthalazine (1100 g.) is added portionwise over a 30 minute period to a cooled solution of sodium ethoxide (4.5 liters). The reaction mixture is then refluxed for 1 hour followed by treatment with Dicalite and filtration. The product crystallizes upon cooling and is collected and washed.

(b) 1 - hydroxylamino - 4 - ethoxyphthalazine.—A mixture of the 1,4-diethoxyphthalazine (1000 g.), prepared as described in step (a), anhydrous sodium acetate (1880 g.) and hydroxylamine hydrochloride (956 g.) in methanol (7.0 liters) are refluxed with stirring for 6 hours. The reaction mixture is cooled and the product filtered off, washed and dried to yield 911.7 g. (97%) yellow needles, M.P. 201°–204° C. (d).

*Analysis.*—Calculated for $C_{10}H_{11}N_3O_2$: C, 58.5%; H, 5.4%; N, 20.5%. Found: C, 58.5%; H, 5.4%; N, 20.5%.

In like manner the following were also prepared:

EXAMPLE 33

1-hydroxylamino-4-methoxyphthalazine

M.P. (hydrochloride) 128°–130° C.

EXAMPLE 34

1-methoxyamino-4-ethoxyphthalazine

M.P. 70°–72° C.

*Analysis.*—Calculated for $C_{11}H_{13}N_3O_2$: C, 60.26%; H, 5.98%; N, 19.16%. Found: C, 60.33%; H, 5.95%; N, 18.99%.

EXAMPLE 35

1-hydroxylamino-4-dimethylaminoethoxyphthalazine

M.P. 230°–233° C.

*Analysis* (as monohydrochloride monohydrate).—Calculated for $C_{12}H_{16}N_4O_2 \cdot HCl \cdot H_2O$: C, 47.60%; H, 6.33%; Cl, 11.71%; N, 18.51%. Found: C, 47.73%; H, 6.14%; Cl, 11.81%; N, 18.30%.

EXAMPLE 36

1-methoxyamino-4-dimethylaminoethoxyphthalazine

M.P. 93°–94° C.

*Analysis.*—Calculated for $C_{13}H_{18}N_4O_2$: C, 59.52%; H, 6.92%; N, 21.36%. Found: C, 59.61%; H, 7.13%; N, 21.48%.

EXAMPLE 37

1-hydroxylamino-4-diethylaminoethoxyphthalazine

M.P. 90°-91° C.

*Analysis.*—Calculated for $C_{14}H_{20}N_4O_2$: C, 60.85%; H, 7.30%; N, 20.28%. Found: C, 61.25%; H, 7.04%; N, 19.95%.

EXAMPLE 38

1-hydroxylamino-4-(2-n-piperidinoethoxy)phthalazine

M.P. 119° C.

*Analysis.*—Calculated for $C_{15}H_{20}N_4O_2$: C, 62.48%; H, 6.99%; N, 19.43%. Found: C, 62.36%; H, 7.04%; N, 19.15%.

EXAMPLE 39

1-hydroxylamino-4-(2-N-morpholinoethoxy)phthalazine

M.P. 151° C.

*Analysis.*—Calculated for $C_{14}H_{18}O_3N_4$: C, 57.92%; H, 6.25%; N, 19.30%. Found: C, 57.97%; H, 6.37%; N, 19.10%.

EXAMPLE 40

1-hydroxylamino-4-(2-hydroxyethoxy)phthalazine

M.P. 212°–222° C.

*Analysis.*—Calculated for $C_{10}H_{11}N_3O_3$: C, 54.3%; H, 5.0%; N, 19.0%. Found: C, 54.2%; H, 5.1%; N, 18.8%.

EXAMPLE 41

1-methoxyamino-4-(2-hydroxyethoxy)phthalazine

M.6. 99°-101° C.

*Analysis.*—Calculated for $C_{11}H_{13}N_3O_3$: C. 56.2%; H, 5.6%; N, 17.9%. Found: C, 56.1%; H, 5.7%; N, 18.0%.

EXAMPLE 42

1-hydroxylamino-4-(2-methoxyethoxy)phthalazine

M.P. 182°–185° C.

*Analysis.*—Calculated for $C_{14}H_{11}N_3O_3$: C, 56.2; H, 5.6%; N, 17.9%. Found: C, 56.2%; H, 5.8%; N, 17.9%.

EXAMPLE 43

1-hydroxylamino-4-phenoxyphthalazine

M.P. 196°–200° C.

*Analysis*—Calculated for $C_{14}H_{11}N_3O_2$: C, 66.4%; H, 4.4%; N, 16.6%. Found: C, 66.6%; H, 4.3%; N, 16.7%.

The following examples are illustrative of the preparation, according to the third described reaction sequence, of substituted hydroxylaminophthalazines wherein the substituent in the 4-position is a cycloalkyleneimino group or one of its hereinabove described equivalents containing a tertiary nitrogen atom through which it is attached to the phthalazine nucleus.

EXAMPLE 44

1-hydroxylamino-4-N-morpholinophthalazine (a) 1, 4-Diphenoxyphthalazine.—Sodium phenoxide (58.3 g.), prepared by the addition of phenol to a solution of sodium in alcohol and evaporating to dryness, is reacted with 1, 4-dichlorophthalazine (50 g.) in toluene (1000 ml.) by heating under reflux overnight. After evaporation of the solvent, the solid obtained is washed with hot water and then crystallized from ethyl acetate, giving colorless needles, (34.5 g., 49%), M.P. 220°–222° C.

(b) 1, 4-Dimorpholinophthalazine.—A solution of 1, 4-diphenoxyphthalazine (25 g.), prepared as described in step (a), in morpholine is heated under reflux overnight. The excess morpholine is then evaporated under reduced pressure and the residue washed with hot water. This is then recrystallized from dimethylformamide to give 12.1 g. of small needles, M.P. 205°–207° C.

(c) 1-Hydroxylamino-4-morpholinophthalazine — A solution of 1, 4-dimorpholinophthalazine (20 g.) in methanol (150 ml.) is treated with hydroxylamine hydrochloride (13.9 g.) and sodium acetate (27.3 g.) and heated under reflux overnight. After cooling, the methanol is distilled away under vacuum an the residue shaken with warm water (250 ml.). After filtering, and washing with water and methanol, the crude product (14.8 g. 90.2%) is recrystallized from aqueous dimethylformamide to give pale yellow needles (12.1 g.) M.P. 210°–230° C. (d).

*Analysis.*—Calculated for $C_{12}H_{14}N_4O_2$: C, 58.5%; H, 5.7%; N, 22.75%. Found: C, 58.6%; H, 5.6%; N, 22.6%.

In like manner the following were also prepared:

EXAMPLE 45

1-hydroxylamino-4-piperidinophthalazine

M.P. 232° C. (d).

*Analysis.*—Calculated for $C_{13}H_{16}N_4O$: C, 63.9%; H, 6.6%; N, 22.9%. Found: C, 63.8%; H, 6.8%; N, 22.85%.

EXAMPLE 46

1-hydroxylamino-4-N-(N-methylpiperazine)phthalazine

M.P. 215°–217° C.

*Analysis.*—Calculated for $C_{13}H_{17}N_5O$: C, 60.2%; H, 6.6%; N, 27.0%. Found: C, 60.4%; H, 6.8%; N, 26.7%.

The subject matter which the applicants regard as their invention is particularly pointed out and distinctly claimed as follows:

1. A compound of the formula

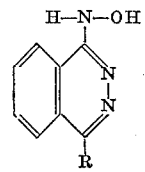

wherein R is hydrogen, lower alkyl, phenyl, phenyl-lower alkyl, pyridyl-lower alkyl, carbo-lower alkoxy-lower alkyl, carbamyl-lower alkyl, anilino, lower alkoxy-lower alkyl, amino-lower alkyl, lower alkoxy, di-lower alkylamino-lower alkoxy, phenoxy, hydroxy-lower alkoxy, lower alkoxy-substituted lower alkoxy, or cycloalkyleneimino of 4 to 5 carbon atoms.

2. 1-hydroxylaminophthalazine.

3. 1-hydroxylamino-4-lower alkylphthalazine.

4. A compound according to claim 3 wherein said lower alkyl is methyl.

5. A compound according to claim 3 wherein said lower alkyl is n-propyl.

6. 1-hydroxylamino-4-phenyl-lower alkylphthalazine.

7. 1-hydroxylamino-4-pyridyl-lower alkylphthalazine.

8. 1-hydroxylamino-4-carbo-lower alkoxy-lower alkylphthalazine.

9. 1-hydroxylamino-4-carbamyl-lower alkylphthalazine.

10. 1-hydroxylamino-4-lower alkoxy-lower alkylphthalazine.

11. 1 - hydroxylamino-4-amino-lower alkylphthalazine.

12. 1-hydroxylamino-4-lower alkoxyphthalazine.

13. A compound according to claim 12 wherein lower alkoxy is ethoxy.

14. 1 - hydroxylamino - 4 - di - lower alkylamino-lower alkoxyphthalazine.

15. A compound according to claim 14 wherein di-lower alkylamino-lower alkoxy is dimethylaminoethoxy.
16. 1 - hydroxylamino - 4-hydroxy-lower alkoxyphthalazine.
17. 1 - hydroxylamino - 4 - lower alkoxy-lower alkoxyphthalazine.
18. 1-hydroxylamino-4-phenylphthalazine.
19. 1-hydroxylamino-4-anilinophthalazine.
20. 1-hydroxylamino-4-phenoxyphthalazine.

References Cited

Leick-Berichte 38, 3918 (1905).

ALEX MAZEL, Primary Examiner
R. V. RUSH, Assistant Examiner

U.S. Cl. X.R.

260—247.5; 424—248, 250